(12) United States Patent
Shahi et al.

(10) Patent No.: US 7,444,423 B2
(45) Date of Patent: Oct. 28, 2008

(54) COMMUNICATION SYSTEM AND METHOD FOR DATA WEB SESSION TRANSFER

(75) Inventors: Anuroop Shahi, Chippenham (GB); Michael R Gardner, Ipswich (GB)

(73) Assignee: British Telecommunications public limited company, London (GB)

( * ) Notice: Subject to any disclaimer, the term of this patent is extended or adjusted under 35 U.S.C. 154(b) by 685 days.

(21) Appl. No.: 10/500,827

(22) PCT Filed: Jan. 14, 2003

(86) PCT No.: PCT/GB03/00090

§ 371 (c)(1),
(2), (4) Date: Jul. 7, 2004

(87) PCT Pub. No.: WO03/063451

PCT Pub. Date: Jul. 31, 2003

(65) Prior Publication Data

US 2005/0033843 A1 Feb. 10, 2005

(30) Foreign Application Priority Data

Jan. 21, 2002 (EP) .................................. 02250380

(51) Int. Cl.
*G06F 15/173* (2006.01)
*G06F 15/16* (2006.01)
(52) U.S. Cl. .................. 709/238; 709/225; 709/226; 709/227; 709/228
(58) Field of Classification Search .................. 709/225, 709/226, 227, 228, 238, 239
See application file for complete search history.

(56) References Cited

U.S. PATENT DOCUMENTS 5,572,528 A 11/1996 Shuen (Continued)

FOREIGN PATENT DOCUMENTS

WO   WO 0070838 A   11/2000

OTHER PUBLICATIONS

Maass, "Open mobility management platform with directory-based architecture and signalling protocols", Open Architectures and Network Programming, 1998, IEEE, San Francisco and New York, pp. 72-87.

(Continued)

*Primary Examiner*—Saleh Najjar
*Assistant Examiner*—Farzana Huq
(74) *Attorney, Agent, or Firm*—Nixon & Vanderhye, PC (57) ABSTRACT

A method of operating a communications system such that connections supporting a communications session being run on a first terminal (1) may be diverted to a second terminal (2) such that the session may be continued on the second terminal comprises the steps of creating a user profile on a server device (3), the user profile identifying a plurality of terminals (1,2), generating from the user profile a set of parameters defining a virtual terminal (12, 22), storing, as parameters of the virtual terminal, details of a current communications session (11) made using a first terminal, on instruction from one of the user terminals (1, 2), diverting the routing of a communications connection supporting the session from the first terminal (1) to a second terminal (2), and and transferring the details of the current session (11) to the second terminal for use in continuing the session. This process allows a user to continue a session on a second terminal if it becomes more convenient to do so, rather than having to start a new session and potentially losing any information obtained whilst using the first terminal.

14 Claims, 5 Drawing Sheets

U.S. PATENT DOCUMENTS

| | | | |
|---|---|---|---|
| 5,838,682 A | | 11/1998 | Backus et al. |
| 5,918,009 A | * | 6/1999 | Gehani et al. .................. 726/8 |
| 5,918,019 A | * | 6/1999 | Valencia .................... 709/227 |
| 6,131,116 A | * | 10/2000 | Riggins et al. .............. 709/219 |
| 6,201,962 B1 | | 3/2001 | Ciotti, Jr. et al. |
| 6,263,363 B1 | * | 7/2001 | Rosenblatt et al. .......... 709/217 |
| 6,708,221 B1 | * | 3/2004 | Mendez et al. ............. 709/248 |
| 6,748,420 B1 | * | 6/2004 | Quatrano et al. ............ 709/205 |
| 6,862,626 B1 | * | 3/2005 | Ryu .......................... 709/227 |
| 6,944,664 B1 | * | 9/2005 | Chantrain et al. ........... 709/227 |
| 7,065,568 B2 | * | 6/2006 | Bracewell et al. ........... 709/223 |

OTHER PUBLICATIONS

Chong et al, "e-CoBrowse: co-navigating the Web with chat-pointers and add-ins—problems and promises", Parallel and Distributed Computing and Systems, Proceedings of 2000 Conference on Parallel and Distributed Computing and Systems, vol. 2, Nov. 6-9, 2000, pp. 803-808.

Maass, "Open Mobility Management Platform with Directory-Based Architecture and Signalling Protocols", Open Architectures, and Network Programming, 1998, IEEE San Francisco, CA, pp. 72-87.

Chong et al, e-CoBrowse: Co-Navigating the Web with Chat-Pointers and Add-Ins—Problems and Promises:, Parallel and Distributed Computing and Systems Proceedings of 2000 Conference on Parallel and Distributed Computing and Systems, vol. 2, Nov. 6-9, 2000, pp. 803-808, XP001080672.

NETSCAPE: "Flexible Roaming Access", NETSCAPE Homepage, 'Online! 2000, XP002157822.

Hipbone: "Hipbone Unveils Live Interaction Platform for Next Generation Contact Centers", Hopbone Press Releases, 'Online! Oct. 23, 2001, p. 1, XP002202070.

* cited by examiner

COMMUNICATION SYSTEM AND METHOD FOR DATA WEB SESSION TRANSFER

This application is the US national phase of international application PCT/GB03/00090 filed 14 Jan. 2003 which designated the U.S. and claims benefit of EP 02250380.9, dated 21 Jan. 2002, the entire content of which is hereby incorporated by reference.

TECHNICAL FIELD

This invention relates to the integration of communications devices.

BACKGROUND

Users often have a number of different communications devices for use in different contexts. For example the user may need have a requirement for mobility, so that he can access communications facilities from a number of different locations or whilst on the move. He may also, from time to time, need the ability to view a large screen or to generate "hard copy" output, requiring a printing capability. However, mobile devices have of necessity to be small, so large screens and printers are not normally associated with such devices. For this reason, a user may have a mobile device and a "desktop" device, the former having a smaller capability set than the latter. These devices function independently, which means the user has to define preferences and profiles for each device. It would be very convenient to unify a user's range of communication devices so they all share common preferences and act as a single "virtual" terminal in which the devices are differentiated by certain attributes such as mobility and output capabilities (screen size, availability of print facilities etc). Using this unified approach would allow the user to set profiles on this virtual terminal (by inputting an instruction using one of its constituent devices), to arrange that all devices are notified of these changes. This would allow a user to start an operation such as a computing session on one device and continue it on another.

For example, a user at home may have spent several hours searching web pages related to a particular topic and may then require access to these from work. As another example, a user surfing an internet site using a personal computer may wish to continue surfing whilst travelling. One device-unifying system is a product called "Hipbone". This is discussed, for example, in "E-Business Essentials" by Cade Metz, *PC Magazine* Jun. 21, 2000:

"People Who Need People" by Jim Sterne in *Inc* magazine— Sep. 15, 2000

"Many Happy Returnees", by J Blackwood, *Computer Shopper* Aug. 8, 2001

"Digital Devices: Navigating the Web with friends" in *Interactive Week*, Feb. 4, 2000

A similar system known as E-CoBrowse is described by Chong and Sakauchi at page 803-808 of the "Proceedings of the IASTED International Conference"—Las Vegas USA, November 2000.

Hipbone and E-Co-Browse are multi-party collaboration tools that enable individuals to co-browse the same web page and also send annotations and chat (to support their collaboration). They work purely at the URL level, whereby user's browsers are synchronised to request the same URL. They provide an Internet co-navigation service, which allows sales staff to 'connect browsers' with their customers and jointly view online product demonstrations, fill out complex web forms, and work through online transactions together. Among its key features are "True Shared Browsing", which allows customer service and sales representatives ("agents") to co-browse with customers and navigate the web together, and synchronises the agent's and customer's activities. Using this, real-time Interaction is achievable, all participants being allowed to direct the browser with the results echoed to each participant's browser. Hipbone's software supports functions such as authentication using "cookies" and order transaction processing. Using the shared browser allows form filling to be echoed to all participants. Forms can therefore be filled in using assistance from the serving participant (sales representative). Hipbone's high level architecture is based on a proxy mechanism. Basically, every web response is held on the central application server accessed by the shared browsers. However, there is no network based representation of the web session state (history, bookmarks, cookies, etc) and a user would not be able to switch from using one device to using another unless the second device had already been connected to the session from the outset.

Systems such as the "Netscape" flexible roaming access function provide data synchronisation so that a user can copy data between two devices—for example a laptop computer and a desktop computer—when they are connected to each other. In this way, if a user has modified a state using one of the devices whilst either or both devices are 'offline', that state can be updated on the other device once the offline devices are re-connected.

International Patent Specification WO00/70838 (Patil) describes a system that maintains a network-based record of the user's preferences and session information, allowing the user to access his personal information (eg. previous web pages, bookmarks, etc) from different devices. However, if the user, having begun work on one device, desires to continue on another device, he would have to store the results of the web session he was using, log-off one device and then go to the other device, relog in, and then select the stored details of the previous web session that he wishes to use.

None of these systems allow a user to continue an individual communications session on a different terminal to that on which the session was started.

SUMMARY

According to the present invention, there is provided a communications system arranged such that connections to a first terminal supporting a communications session on the first terminal may be diverted during the course of the session such that the session may be continued on a second terminal, the communications system comprising:
 a server device for processing calls,
 means for creating a user profile on the server device, the user profile identifying a plurality of terminals,
 means for generating from the user profile a set of parameters defining a virtual terminal
 a store for parameters of the virtual terminal, said parameters being details of a current communications session made using a first terminal,
 means for diverting, on instructions from a user device, the routing of a communications connection supporting the session from the first terminal to a second terminal,
 means for transferring the details of the current session to the second terminal for use in continuing the session.

According to a second aspect, the invention comprises method of operating a communications system such that a connection to a first terminal supporting a communications session on the first terminal may be diverted during the course of the session such that the session may be continued on a second terminal, the method comprising the steps of creating a user profile on a server device, the user profile identifying a plurality of terminals, generating from the user profile a set of parameters defining a virtual terminal, storing, as parameters of the virtual terminal, details of a current communications session made using a first terminal, on instruction from the user, diverting the routing of a communications connection supporting the session from the first terminal to a second terminal, and transferring the details of the current session to the second terminal for use in continuing the session.

The invention gives the user the ability to instantaneously transfer a current data session to a range of various devices (e.g. PC to PC, PC to WAP Phone, WAP phone to PDA, etc). Any data session information may be transferred between terminals to create a session's state, for example bookmark history, browsing history, or form elements.

Multiple sessions can be run, which can all be submitted to the destination device. In contrast with the prior art systems discussed above, in the present invention the session is transmitted to the destination device and run on that device. The session that has been transmitted from the source device is closed.

The system can handle transfers requiring authorisation and those which are unrestricted. This means that sessions will be accessible from a range of different devices such as personal digital assistants, mobile phones, IP phones, Personal computers and many other types of devices.

The present invention's architecture will also allow different web based transfer applications to be present. For example, email applications based on session transfer may be incorporated with relative ease.

BRIEF DESCRIPTION OF THE DRAWINGS

An embodiment of the invention will now be described, with reference to the Figures, in which.

DETAILED TECHNICAL DESCRIPTION

Figure 1:
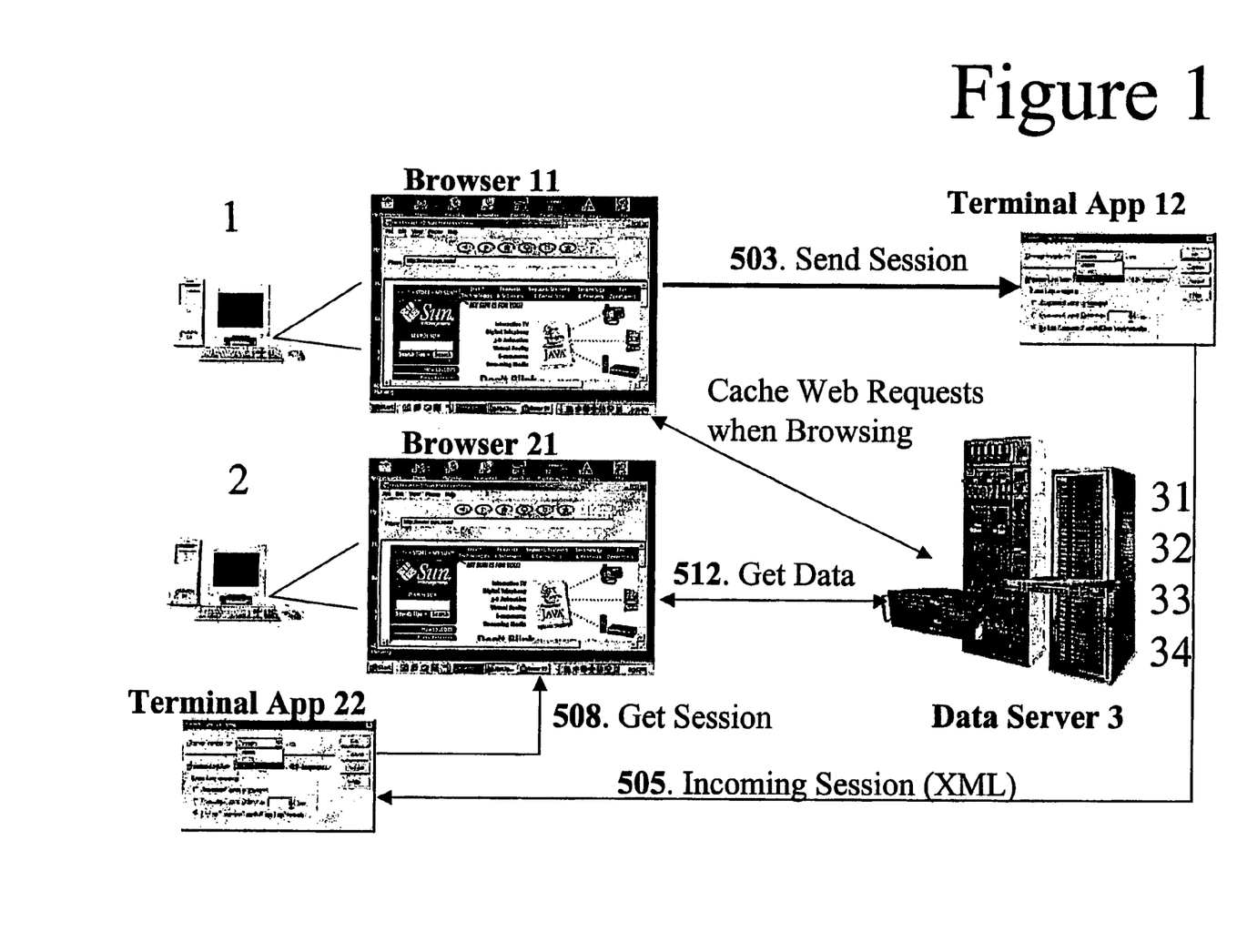
FIG. 1 is a schematic representation of the various components making up the system, with an indication of the information flows which take place when the system is in operation

As can be seen from FIG. 1, from a high level perspective, the following components are provided. Browser applications 11, 21 running on respective terminals 1, 2 are capable of providing HTML (hypertext markup language) browsing capabilities and display any incoming active sessions. They can also each run a terminal application 12, 22. This application manages web data sessions, which may be present on a user's device 1, 2. It also processes any incoming sessions.

Session information, holding such information such as the session's web page and form parameter values etc, can be stored by the terminals and transferred between them.

The central server 3 is used for holding the session information, and also provides other data which can be used by the terminals. In particular, it holds a user profile, which holds any 'User Specific' attributes such as sessions, bookmarks etc. These include permanent attributes, attributes changeable on a specific command from the user, or attributes generated automatically, tracking the operation of the individual terminals.

The basic steps involved within the process will now be described, with reference to FIG. 1. A more detailed description of the process will follow with reference to FIGS. 2, 3, 4 and 5.

A user logs into the system by using an interface to the server 3 appropriate to the terminal 1 that he is using. For example he may use a WAP interface for telephones, or HTML for devices capable of supporting that protocol, such as PCs and PDAs (Personal computers and personal digital assistants). A user profile is created on the main server 3. Once the user profile has been created, the user is invited to set any relevant preferences, which are then loaded onto the terminal. The user can then run the web browser 11. Note that the terminal 1 will also allow other applications to be executed such as Email clients.

Once the web browser 11 has been launched, the user can select a "Session Tracking" option. From this point onwards, the operation of the browser 11 is tracked by the terminal application 12. The server 3 therefore stores the user's web history and browsed web pages within a session object.

When the user wants to 'transfer' a session, the destination device 2 has to be selected via the web browser 11, for example by clicking on a transfer button on the browser screen (step 503), to transfer the session. This causes a transfer request 505 to be sent to the destination device's terminal application 22. Having received an incoming request, the destination terminal application 22 requests the relevant session from the server 3 (step 508). The specified session is then transferred and displayed in the destination device's web browser 21 (step 512).

The invention gives the user the ability to instantaneously transfer a web session to a range of various devices (E.g. PC to PC, PC to WAP Phone etc)

Figure 2:
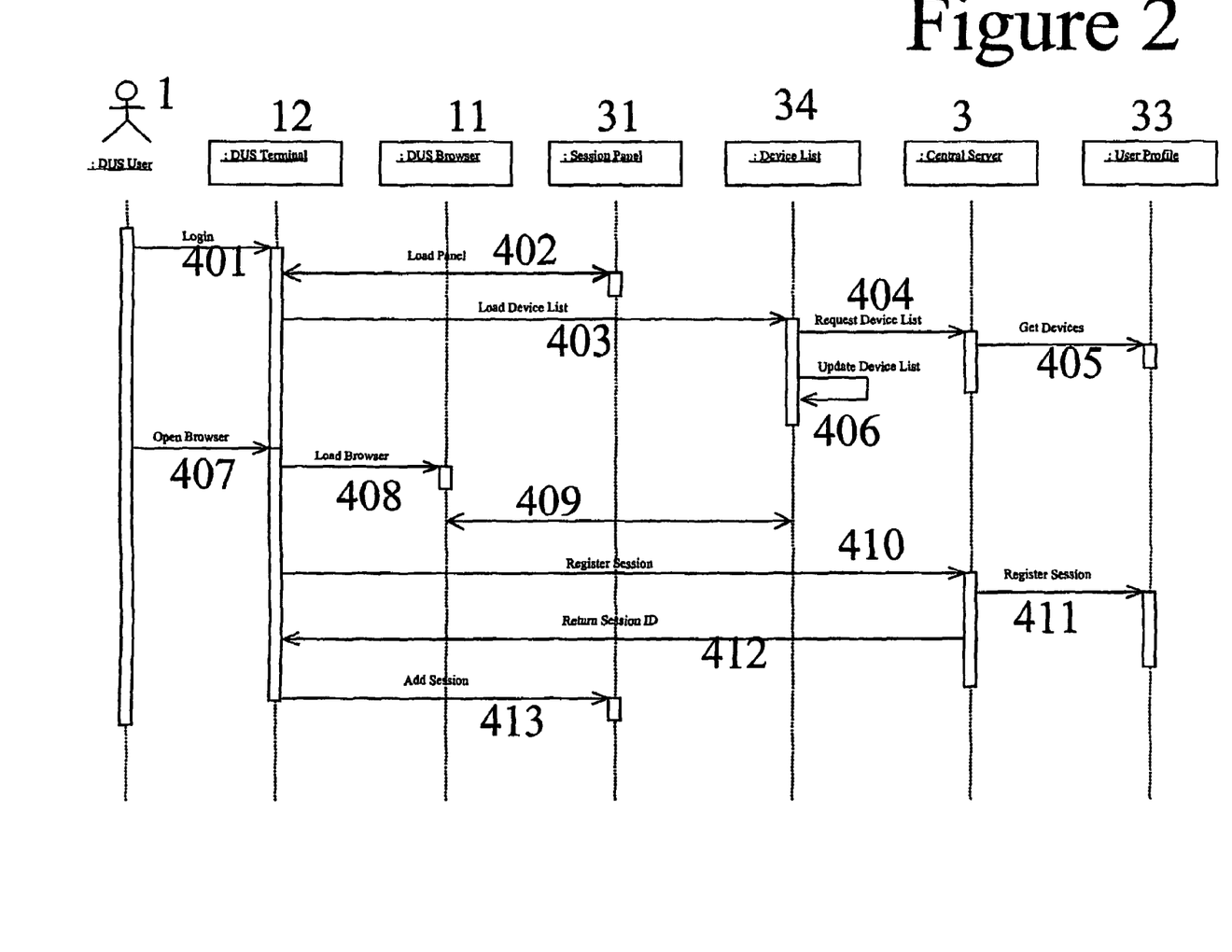
FIG. 2 is a schematic representation of the information transfers used in generating a session
Figure 4:
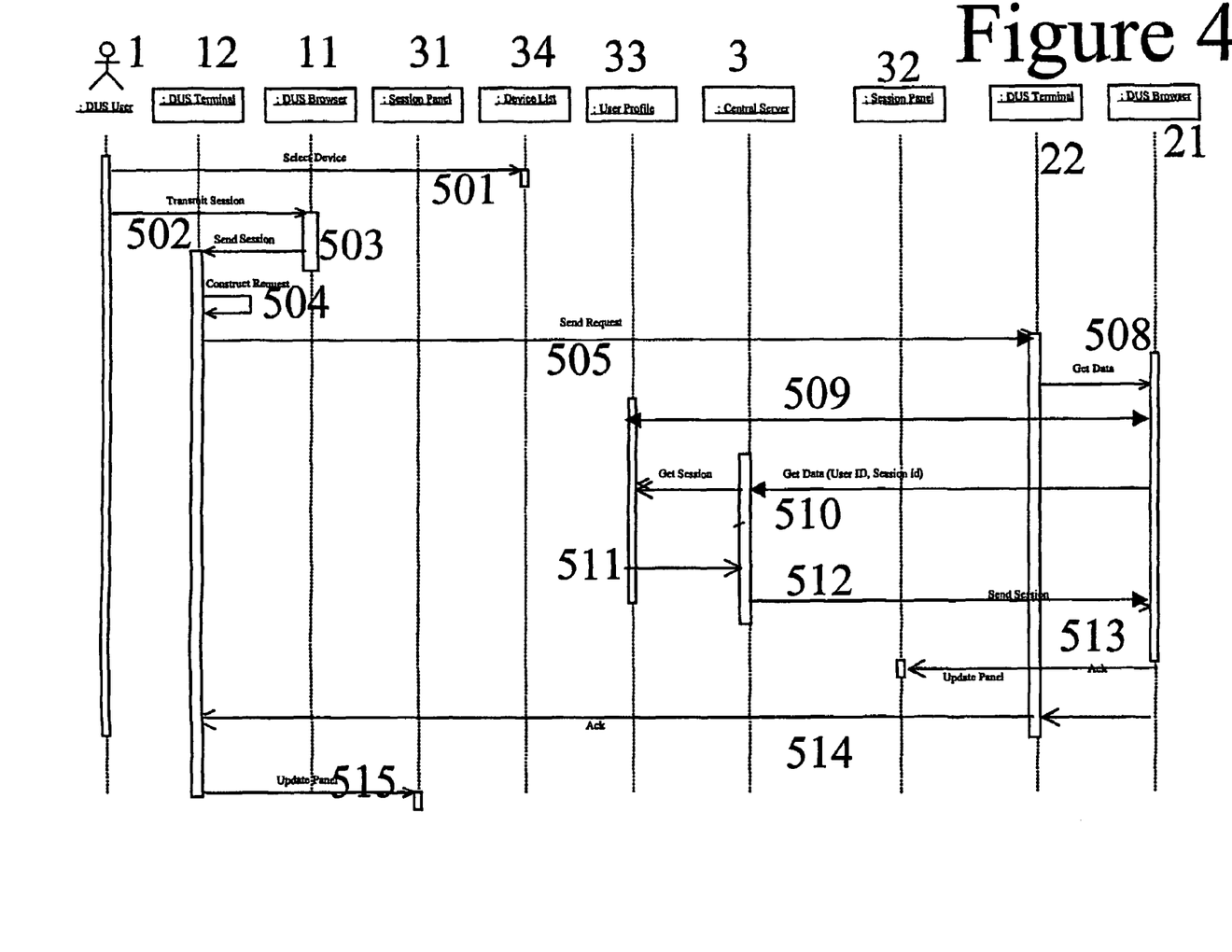
FIG. 4 is a schematic representation of the information transfers used in transferring a session from one terminal to another

Two sequence diagrams are shown as FIGS. 2 and 4, which illustrate how sessions are created and transferred. Note that FIG. 4 applies to devices that can poll their input/output ports. Mobile devices and PDAs that do not have polling features will request the sessions directly through a Web interface from the server 3.

As shown in FIG. 2, a user who has logged into the system using a terminal application 12 running on a terminal 1, is first presented with the terminal screen (step 401), which allows a web browser to be opened, as will be discussed (steps 407, 408). Also at logon, a session panel 31 is loaded on the server 3 (step 402) and a device list retrieval process 34 is initiated (step 403). The session panel 31 is a process which records the details of the session that is running, to allow those details to be transferred to another device when required. The device list retrieval process 34 retrieves a list of devices available to the user to which the session may be transferred, or which may require updating of functions such as voice mail activation. The list is stored in a user profile 33 and retrieved by the central server 3 (step 405) in response to a request 404 from the device list function 34. The device list may be amended by the processor 34 during the session (step 406), for example by changing settings of forwarding instructions.

The terminal screen presented to the user (step 402) includes an option to allow access to a web browser. Selecting this (step 407) opens the web browser 11 (step 408). The terminal can then retrieve attributes stored from previous sessions from the central server 3 (step 409). Thus the user logs into the server using a special application and then selects to open a web browser.

In an alternative arrangement a standard web browser could itself have a facility to select the session-tracking feature which would then enable the server based session logging and transfer to take place when the user loads his standard browser. Some form of authentication (ie. username) would probably still be required, but the aim is to make this much easier to use and also allow users to use their standard web browser rather than a special one, which avoids the need for the user having to install a special tracking application on each device.

Figure 3:
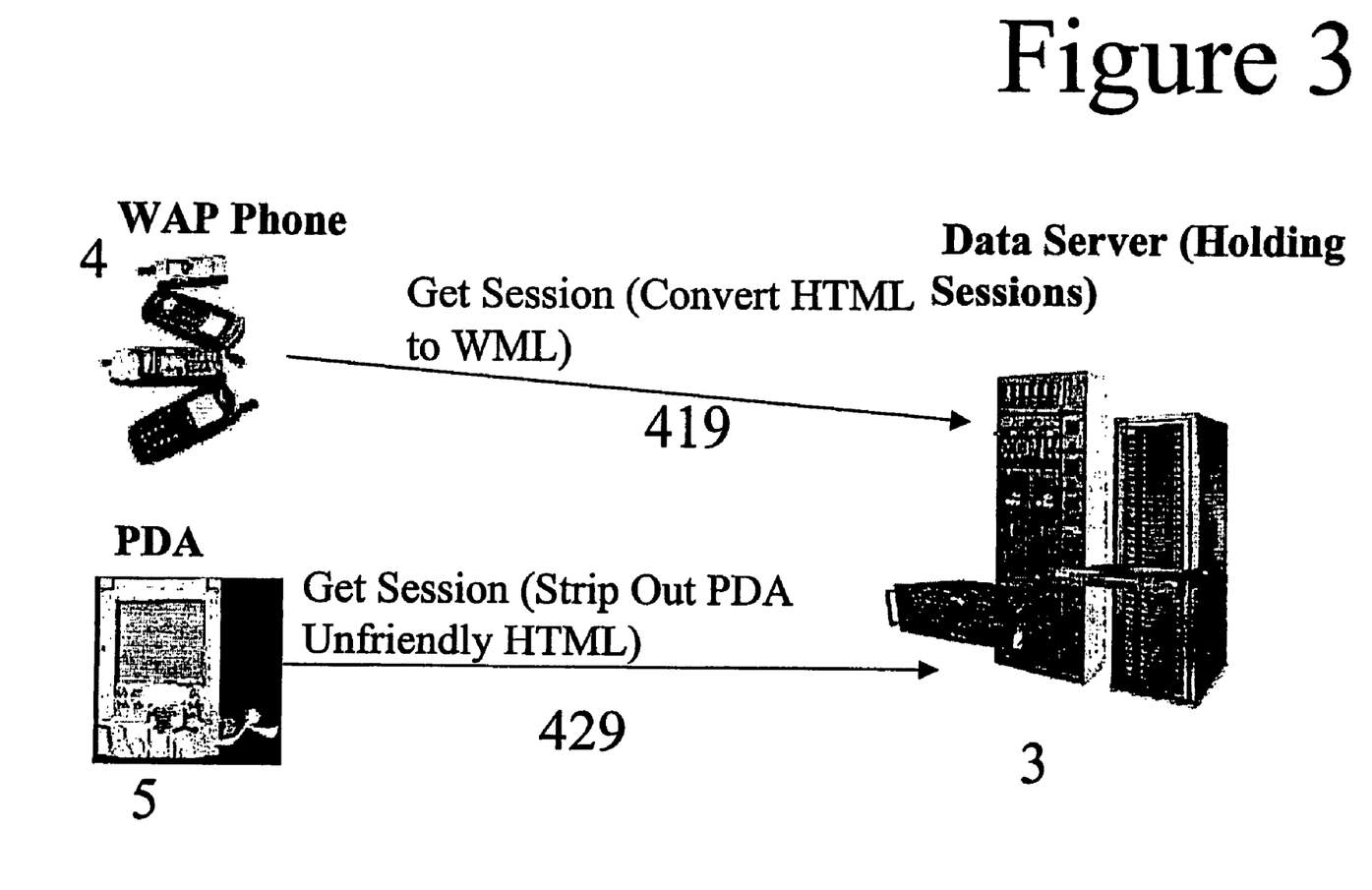
FIG. 3 is a schematic representation of the use of the system to access data using terminals having different capabilities

Mobile devices and PDAs accessing the server will require the content to be revised for their display capabilities. Thus, a PC accessing the server 3 (step 409, see FIG. 2) can use standard html language and protocols. As shown in FIG. 3, a WAP—enabled telephone 4 accessing the server 3 (step 419) requires the session language to be converted by the server from html (as used in the PCs 1,2 and the server 3) into a language usable by the terminal 4 to which the session is to be transferred. The server 3, holding the user profile which includes the characteristics and capabilities of each terminal, performs the necessary conversion when it receives a request to transfer a session to such a terminal. Similarly, a PDA can use html, but with some limitations generally as a result of its small screen size and the relatively small bandwidth available for communication out the full data. If a request to transfer to a PDA 5 is received (step 429), the data server adapts the session accordingly by removing such functions. The session run on the data server 3 ("virtual terminal") is tracked in html, so that if transfer to a html-compatible terminal is required, the full capability can be made available.

If the user has "Session Tracking" enabled, all browsed web pages are cached on the main server 3. The user sends a request to register a session (step 410) from the terminal application 12 to the central server 3. A session identity is then generated by the server 3 and stored (step 411) in the user profile 33 and transmitted to the user terminal 12 (step 412). This session is then added to the session panel 31 running on the server 3 (step 413).

As will now be discussed with reference to FIG. 4, other terminals can then retrieve these sessions. For example, the user could be browsing a search engine, and want to transfer the web session to another device, for example a mobile phone. As another example, the user may wish to move visual output from a mobile device with small display to a fixed device with a larger screen. In order to do this, the user may accesses the session by making a request to the main server. Having requested the session from the main server, the current session can be retrieved. The form is already filled with the correct search parameters. Once the session has been transferred to the other device, the user can continue to surf the web site.

In FIG. 4 it is assumed that the transfer is initiated from the device 1 initially running the session, but there may be situations, for example when the first device 1 has been disabled, when a transfer may be initiated from the device 2 to which the session is to be transferred.

The transfer process starts when the user accesses the device list 34 from a first terminal 1 and selects a second terminal 2 to which he wishes to transfer (step 501). He then generates an instruction (502) for the browser 11 to initiate the transfer. The browser in turn instructs the terminal application 12 (step 503) to construct the transfer instruction (step 504) which is then transmitted to the corresponding terminal application 22 in the second terminal 2 (step 505). From this point the terminal 2 and central server 3 co-operate in a number of steps (509-513) similar to those performed in setting up a session initially (409-413, FIG. 2) More specifically, the browser 21 in the destination terminal 2 retrieves the user attributes from the central server (step 509) and sends a request to register a session (step 510) from the terminal application 22 to the central server 3. The session identity previously stored (step 411) in the user profile 33 is retrieved (step 511) and transmitted to the user terminal 12 (step 512). This session is then added to a session panel 32 associated with the destination terminal 2 and running on the server 3 (step 513).

The destination terminal 21 next transmits an acknowledgment that the transfer has been successful back to the originating terminal (step 514) which updates its own copy of the session panel 31 running on the server 3 (step 515).

Figure 5:
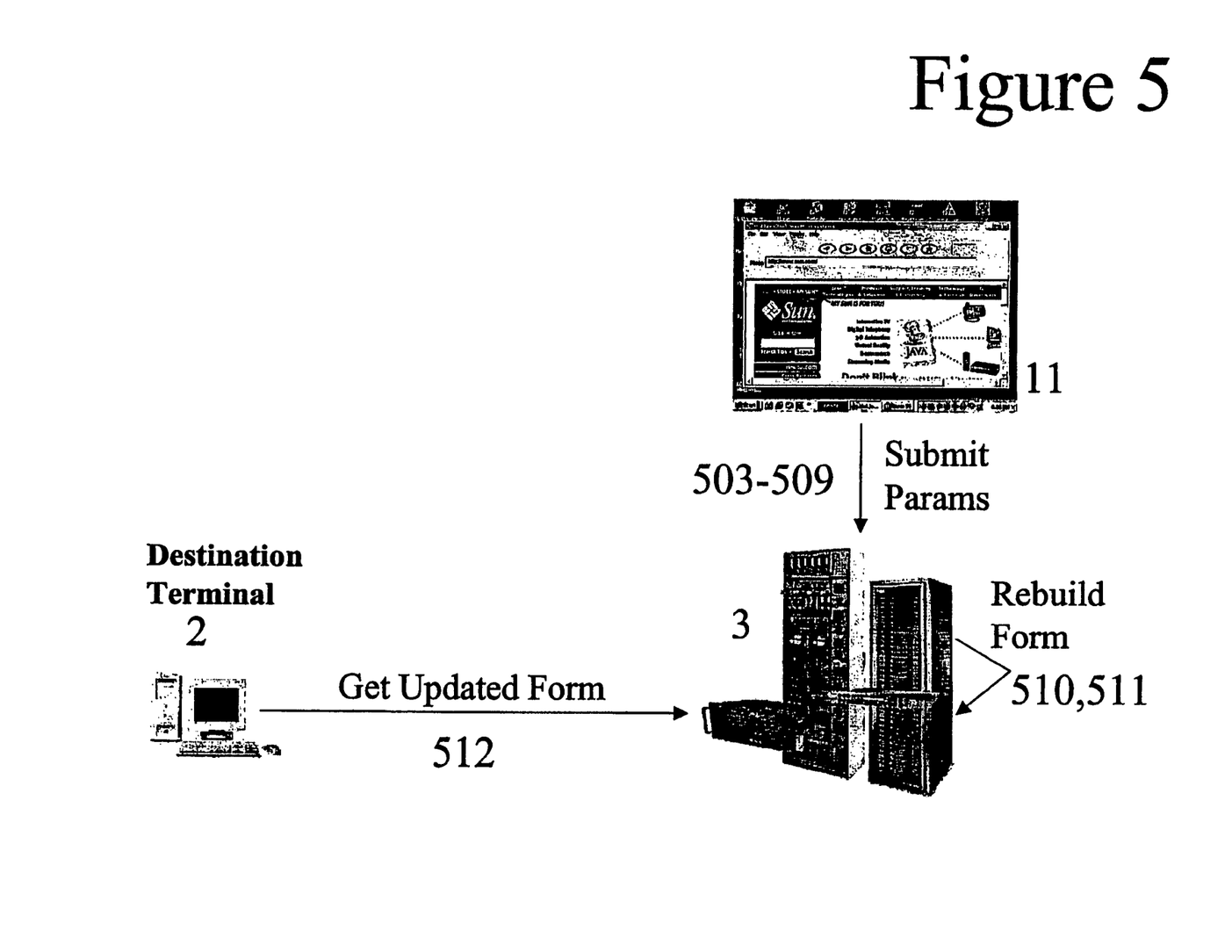
FIG. 5 is a schematic representation of the use of the system to transfer data generated as html forms

As shown in FIG. 5, one useful feature of the invention is the ability to transfer html forms and their respective values, that is to say not only the blank form stored on a website, but the values inserted in that form during a session. In order to transfer the form, the destination browser 21 first checks to see whether 'Session Tracking' has been activated. If so, when the transfer (step 512) takes place, the relevant data is extracted, and transmitted to the Server 3 (step 503-509). The form can then be rebuilt by the server 3 in its current state (step 510,511), and downloaded to the destination terminal 2 (step 512). Note that if the source and destination terminals 1, 2 are of different types the layout and other features of the form may differ. The system only requires that both versions have corresponding fields for data entry, and that the server 3 can transfer entries from a given field in one version to the corresponding field in the other.

The invention claimed is:

1. A communications system arranged such that connections to a first terminal supporting a communications session on the first terminal may be diverted during the course of the session such that the session may be continued on a second terminal, the communications system comprising:
   a server device for processing calls,
   means for creating a user profile on the server device, the user profile identifying a plurality of terminals,
   means for generating from the user profile a set of parameters defining a virtual terminal,
   a store for the parameters defining the virtual terminal, said parameters recording the progress and history of a current communications session made using a first terminal,
   means for diverting, on instructions from a user device, the routing of a communications connection supporting the session from the first terminal to a second terminal,
   means for transferring the details of the current session to the second terminal for use in continuing the session.

2. Apparatus according to claim 1, comprising means for storing information relating to each of the plurality of terminals, and means for adapting the details of the current communications session in accordance with the terminal to which the session is to be diverted on receipt of a diversion instruction.

3. Apparatus according to claim 2, comprising means for translation of a session into a data handling protocol suitable for the terminal.

4. A method of operating a communications system such that a connection to a first terminal supporting a communications session on the first terminal may be diverted during the course of the session such that the session may be continued on a second terminal, the method comprising the steps of creating a user profile on a server device, the user profile identifying a plurality of terminals, generating from the user profile a set of parameters defining a virtual terminal, storing the parameters defining the virtual terminal, said parameters recording the progress and history of a current communications session made using a first terminal, on instruction from the user, diverting the routing of a communications connection supporting the session from the first terminal to a second terminal, and transferring the details of the current session to the second terminal for use in continuing the session.

5. A method according to claim 4, comprising the further steps of storing information relating to each of the plurality of terminals, and on receipt of a diversion instruction adapting the details of the current communications session in accordance with the terminal to which the session is to be diverted.

6. A method according to claim 5, wherein the session is translated into a data handling protocol suitable for the terminal.

7. A method according to claim 4, wherein the diversion of routing is initiated by an instruction transmitted from the second terminal to the server device.

8. A method according to claim 7, wherein the diversion of routing is initiated by an instruction transmitted from the first terminal to the second terminal, causing the second terminal to transmit an instruction to the server device.

9. A method according to claim 5, wherein the diversion of routing is initiated by an instruction transmitted from the second terminal to the server device.

10. A method according to claim 6, wherein the diversion of routing is initiated by an instruction transmitted from the second terminal to the server device.

11. A method according to claim 9, wherein the diversion of routing is initiated by an instruction transmitted from the first terminal to the second terminal, causing the second terminal to transmit an instruction to the server device.

12. A method according to claim 10, wherein the diversion of routing is initiated by an instruction transmitted from the first terminal to the second terminal, causing the second terminal to transmit an instruction to the server device.

13. Apparatus according to claim 1, wherein said system tracks inputs to the first terminal.

14. A method according to claim 4, further comprising the step of tracking inputs to the first terminal.

* * * * *